//

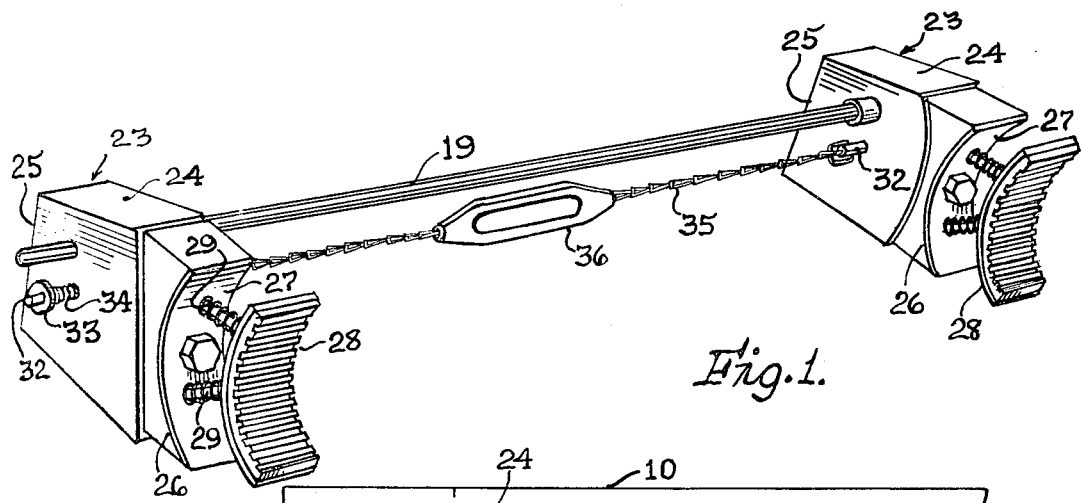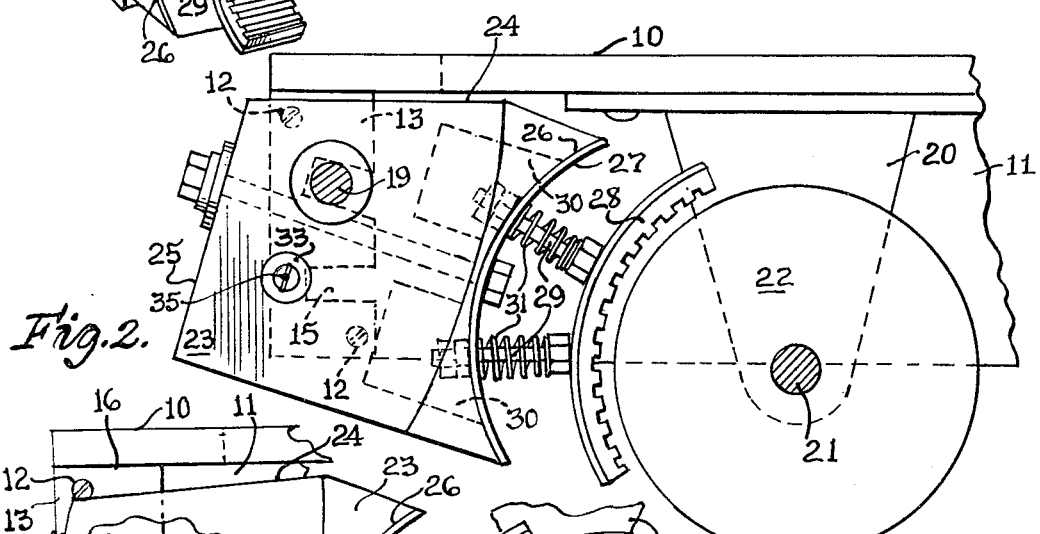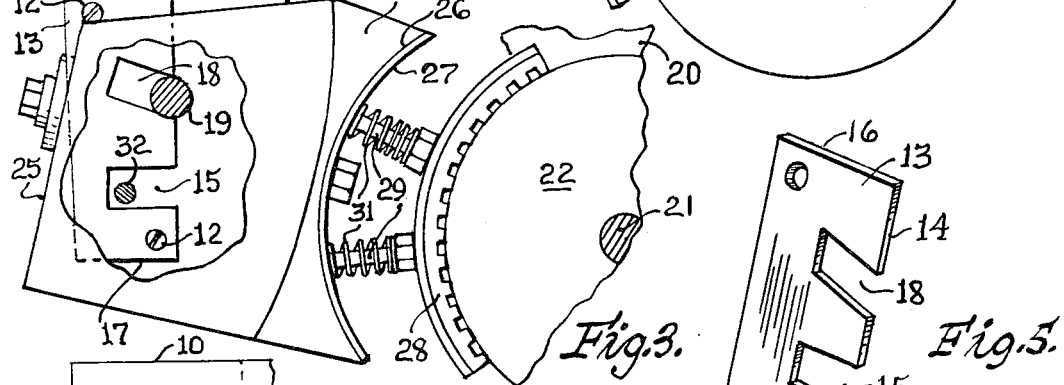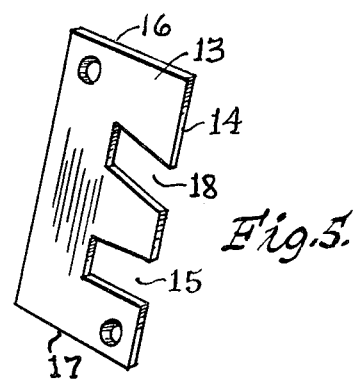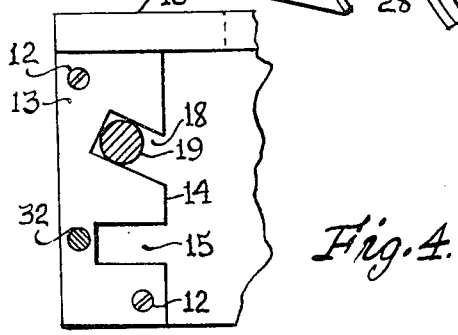

United States Patent Office 3,395,778
Patented Aug. 6, 1968

3,395,778
BRAKE FOR PERAMBULATOR
John Shelby, 1333 Hollywood, Chicago, Ill., 60626
Filed Mar. 7, 1967, Ser. No. 621,173
6 Claims. (Cl. 188—20)

ABSTRACT OF THE DISCLOSURE

A braking device readily installed upon a new or existing manually moved vehicle having supporting brackets for which shaft is mounted a braking assembly. The shaft carries blocking brakes which in turn yieldably support brake pads in close proximity to the periphery of the wheels of the vehicle with the brake blocks and pads movable into braking position by manual movement of the supporting shaft in a direction transverse to its longitudinal length. The brake blocks provide locking pins which cooperate with the mounting supports for releasably locking the brake assembly in braking relation to the wheel of the vehicle.

Summary of invention

The brake for the perambulators is defined in Class 188 "Brakes," Sub-class 167, "Spring Operated Vehicle Brakes" wherein the braking assembly may be readily applied to a new or existing wheeled vehicle and includes braking pads for compression against the periphery of the wheel of the vehicle with the brake pads yieldably carried by braking blocks journaled upon a shaft which has its free ends movably projected into supporting brackets, with the shaft movable in a direction transverse to its longitudinal length by guide slots formed in the supporting brackets for compressing the brake pads against the wheels of the vehicle. The brake blocks carry locking pins which are yieldably projected into locking slots formed in the supporting bracket when the shaft has been moved relative to the supporting brackets into braking position. The invention consists in the novel combination and arrangement of cooperating parts to be hereinafter described and claimed.

The invention will be best understood by reference to the accompanying drawings showing the preferred form of the construction, and in which:

FIG. 1 is a perspective view of the braking device;

FIG. 2 is a fragmentary side elevational view of the braking device as mounted on a perambulator;

FIG. 3 is a fragmentary side elevational view similar to FIG. 2 but with the braking device in an operative position;

FIG. 4 is a fragmentary side elevational view of the supporting bracket and showing in section the shaft and locking pin in relation thereto in a non-operative position; and FIG. 5 is a perspective view of one of the supporting brackets of this invention.

The braking device may be readily associated with a manually moved perambulator which includes a horizontally extending base member 10 having depending side flange members 11. To each of the confronting surfaces of the side flange members 11 may be mounted by means of screws 12 or the like, a support bracket 13. This support bracket 13 is preferably made from a substantially flat metal plate and is generally rectangular in shape as seen in FIG. 5. Formed in the leading edge 14 of the supporting bracket 13 is a first slot 15 which extends parallel to the top and bottom edges 16 and 17 respectively of the supporting brakes 13. The second slot 18 is formed in the leading edge 14 and this slot extends in an inclined plane with respect to the first slot 15 as clearly shown in FIGS. 2 through 5 of the drawings.

A supporting shaft 19 of a length equal to the distance between the side flanges 11 has its free ends projected into each of the slots 18 formed in each of the supporting brackets 13 mounted on such side flanges 11.

To the underside of the base 10 by means of a member 20 is rotatably mounted a shaft 21 which extends in a spaced parallel relation with respect to the supporting shaft 19 and upon which is mounted a pair of wheel members 22, one of which is shown in FIG. 2.

The supporting shaft 19 has journaled on each end thereof a brake block 23. The top wall 24 of the block 23 lies beneath the base 10 and has a rear wall 25 which when the device is in a non-operative position extends beyond the rear edge of the base 10 as well as the side flanges as seen in FIG. 2. The front wall 26 of the block 23 is situated and has mounted thereon a plate 27 to which is yieldably connected a brake pad 28 which is associated in a like manner with respect to the front wall 26 of the brake block 23.

The brake pad 28 has extending from its rear wall a pair of studs 29 which have their free ends projected through suitable apertures formed in the plate 27 with such free ends of the studs 29 received in internal recesses 30 formed in the front wall 26 of the block (see FIG. 2). A coil spring 31 encompasses the shank of each of the studs 29 between the plate 27 and the pad 28.

Also carried by each of the blocks 23 are locking pins 32. These locking pins 32 are of a length to extend through the block 23 so that their outer exposed ends may support a retaining washer 33 which retains a spring 34 coiled upon such exposed end of the pin 32 for yieldably urging the pins outwardly from the block 33 into the direction of the supporting bracket 13. The opposite inner ends of the pins 32 are connected by a suitable means such as a chain 35 being joined to a turnbuckle 36.

Operation of brake device

When the braking device is mounted to a wheeled perambulator by having the supporting brackets 13 connected thereto the brake blocks 23 will be journaled on the shaft 19 and the shaft 19 will have its opposite ends movably projected into the inclined slot 18 formed in the supporting bracket 13. The locking pins will have their free ends slidably engaging the face of the supporting bracket 13 rearwardly of the slot 15. In this condition the brake assembly will be in the position shown in FIG. 2 with the brake pad 28 disengaged from the periphery of the wheel 22.

When the brake is applied the operator need only manually push on the shaft 19 causing the same to move through the inclined slot 18 a distance sufficient to engage the brake pad 28 with the wheel 22. This movement of the shaft 19 causes the brake blocks 23 which are freely journaled on the shaft 19 to tilt slightly thereon until the locking pins 32 ride off the face of the supporting brackets 13 and are yieldably projected into the locking slot 15. In the locking position the assembly is as shown in FIG. 3. The locking movement of the shaft 19 as well as the brake blocks 23 creates a slight compression upon the springs 31 which embrace the studs 29 so that when one wishes to release the brake all that is required is that the chain 35 or turnbuckle 36 be manually moved to withdraw the locking pins 32 from the slot 15 so that the blocks 23 will be free to be urged radially away from the wheel 22 a sufficient distance to prevent the pins 32 from being projected into the slot 15 upon release of the chain 35 with the effect that the device will assume the position as seen in FIG. 2.

Having thus described my invention, what I claim as new and desire to protect by Letters Patent is:

1. A braking device for wheeled perambulators and the like comprising, (a) an elongated shaft connected to the perambulator and movable transversely with respect to its longitudinal length,
(b) means mounting said shaft to the perambulator for guiding movement transversely to its longitudinal length and substantially radial to the wheels of the perambulator,
(c) braking blocks freely journaled on said shaft adjacent each end thereof and in alignment with certain of the wheels of the perambulator,
(d) braking pads yieldably carried by said braking blocks and movable with said blocks and said shaft into braking engagement with the periphery of certain of the wheels of the perambulator,
(e) means yieldably connecting said braking pads to said braking blocks, and
(f) means for latching said shaft after it has been moved radially in the direction of and with the braking pads in braking engagement with certain of the wheels of the perambulator,
(g) said mounting means comprising pins carried by said braking blocks and extending therethrough in parallel relation to said shaft with their outer free ends yieldably projected into cooperating locking means provided by said means upon which said shaft is mounted.

2. A braking device for wheeled perambulators and the like as defined by claim 1 wherein said means mounting said shaft to the perambulator comprises supporting brackets connected in vertical parallel relation to the underside of said perambulator, each of which brackets provides a recess for freely receiving the ends of said shaft with said recesses inclined downwardly with respect to the vertical plane of the supporting bracket so as to guide the movement of said shaft transversely to its longitudinal length and radially in the direction of the wheels of said perambulator.

3. A braking device for wheeled perambulators and the like as defined by claim 1 wherein said means for yieldably connecting said brake pads to said braking blocks comprise radially extending studs carried by the rear wall of said braking pads and having their free ends insertable into internal recesses formed in said braking blocks, with coil springs embracing said studs positioned between a mounting plate carried by said braking blocks and the rear wall of said braking pads normally urging said braking pads in a direction away from said braking blocks into the direction of said certain of the wheels of said perambulator.

4. A braking device for wheeled perambulators and the like as defined by claim 3 wherein the means for latching said shaft comprises pins carried by said braking blocks and extending therethrough in parallel relation to said shaft with their outer free ends yieldably projected into cooperating locking means provided by said means upon which said shaft is mounted.

5. A braking device for wheeled perambulators and the like as defined by claim 3 wherein said means mounting said shaft to the perambulator comprises supporting brackets connected in vertical parallel relation to the underside of said perambulator which provides a recess for freely receiving the ends of said shaft with said recesses inclined downwardly with respect to the vertical plane of the supporting bracket so as to guide the movement of said shaft relative thereto radially in the direction of the wheels of said perambulator.

6. A braking device for wheeled perambulators and the like as defined by claim 4 wherein said means mounting said shaft to the perambulator comprises supporting brackets connected in vertical parallel relation to the underside of said perambulator which provides a recess for freely receiving the ends of said shaft with said recesses inclined downwardly with respect to the vertical plane of the supporting bracket so as to guide the movement of said shaft relative thereto radially in the direction of the wheels of said perambulator.

References Cited
UNITED STATES PATENTS

| | | | |
|---|---|---|---|
| 422,245 | 2/1890 | Miller et al. | 188—20 |
| 506,970 | 10/1893 | Bohn et al. | 188—167 |
| 754,510 | 3/1904 | Snyder | 188—20 |
| 2,176,472 | 10/1939 | Rogers et al. | 188—20 |

MILTON BUCHLER, *Primary Examiner.*

T. W. BUCKMAN, *Assistant Examiner.*